United States Patent [19]

Savelli

[11] 3,758,165

[45] Sept. 11, 1973

[54] TRAILER SWAY CONTROL APPARATUS

[76] Inventor: Joseph A. Savelli, 14 Coquina, St. Augustine, Fla. 32084

[22] Filed: Dec. 2, 1971

[21] Appl. No.: 204,200

[52] U.S. Cl.................. 303/20, 180/103, 188/3 R, 303/7
[51] Int. Cl............................................... B60t 7/20
[58] Field of Search ..... 180/103–104; 188/3 R, 112; 280/432; 303/7, 20

[56] References Cited
UNITED STATES PATENTS

| | | | |
|---|---|---|---|
| 3,566,987 | 3/1971 | Franzel | 180/103 |
| 3,288,240 | 11/1966 | Franzel | 180/103 UX |
| 3,398,991 | 8/1968 | Compton | 180/104 X |

*Primary Examiner*—Milton Buchler
*Assistant Examiner*—Stephen G. Kunin
*Attorney*—Jacox & Meckstroth

[57] ABSTRACT

Apparatus for use in regard to a tow vehicle and a trailer vehicle for automatically applying retardation of movement to the trailer vehicle to eliminate a sway condition which may occur in the trailer vehicle. Sway action of a trailer can be eliminated by applying forces which tend to urge relative movement between the tow vehicle and the trailer vehicle in a direction one from the other. Therefore, momentary retardation of the rate of movement of the trailer vehicle eliminates the sway of the trailer. Sensing mechanism senses that the trailer is in a sway condition and the sensing mechanism causes operation of mechanism which operates the brakes of the trailer for retarding the rate of movement of the trailer with respect to the rate of movement of the tow vehicle. The sensing mechanism is capable of distinguishing between a sway condition of the trailer, in which the trailer moves angularly with respect to the tow vehicle, and an angular condition which exists when the tow vehicle is pulling the trailer around a curve or corner or the like. The sensing mechanism is also capable of sensing the rate of operation of the tow vehicle and does not sense or attempt to prevent angular movement between the trailer vehicle and the tow vehicle if the tow vehicle operation is less than a predetermined rate, such as occurs in parking of the trailer, etc.

13 Claims, 2 Drawing Figures

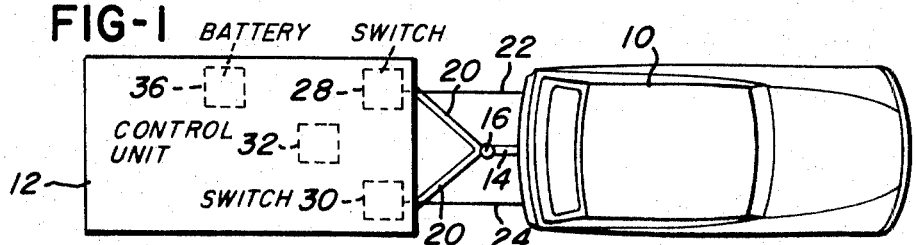
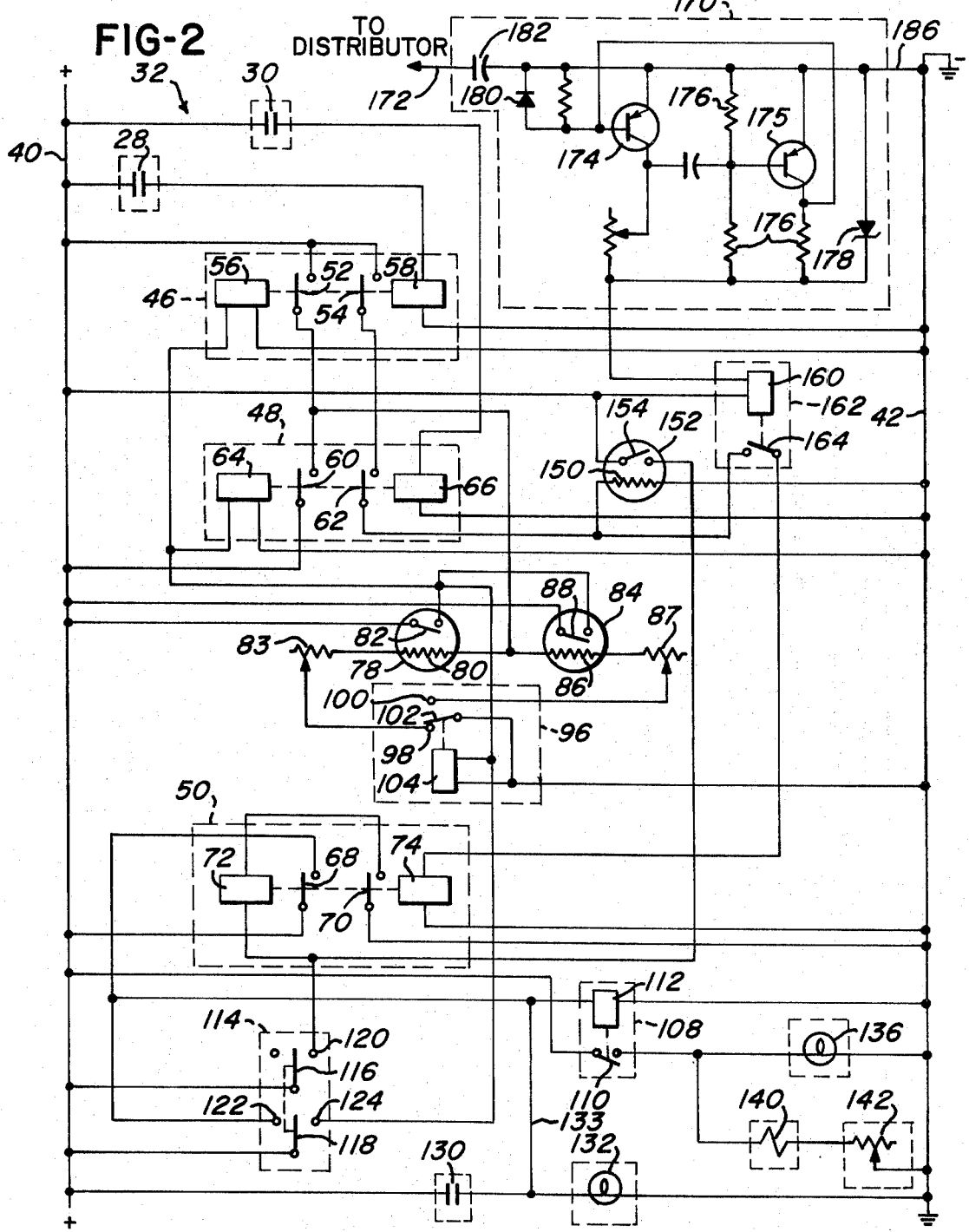

TRAILER SWAY CONTROL APPARATUS

BACKGROUND OF THE INVENTION

When a tow vehicle is towing a trailer vehicle, a condition frequently exists in which the tow vehicle begins to move reciprocally angularly, with respect to the line of movement of the tow vehicle. Thus, a sway condition is said to exist. If such a sway condition is permitted to continue, tipping or "jackknifing" of the trailer vehicle or other objectionable results may occur. Therefore, it is extremely important that the sway condition of the trailer be stopped as soon as possible after the commencing thereof. Numerous types of apparatus have been created in an attempt to automatically stop sway action of a trailer vehicle as soon as possible after the commencement of the sway action. However, many of such types of apparatus have involved rather complex mechanical and/or electrical apparatus. Many types of devices which attempt to automatically prevent excessive sway conditions of a trailer are not capable of distinguishing between reciprocal angular movement of a trailer vehicle and non-reciprocal angular movement between the tow vehicle and the trailer vehicle during the change in direction thereof. Furthermore, many trailer sway control devices have no means for preventing unnecessary or objectionable operation thereof when travel at a low rate of speed is occurring.

It is an object of this invention to provide apparatus which automatically applies braking or retarding action to a trailer to eliminate the sway condition immediately upon the occurrence of the sway condition.

Another object of this invention is to provide apparatus which automatically applies retarding or braking action to a trailer vehicle only when a sway condition exists and only when the rate of travel thereof is above a predetermined rate.

Another object of this invention is to provide such apparatus which includes means for manually applying braking action to a trailer vehicle, without applying braking action to the tow vehicle.

Another object of this invention is to provide such apparatus in which adjustment is provided so that anti-sway action occurs only when a predetermined severity of sway action occurs.

Another object of this invention is to rovide such apparatus which includes means for visually or audibly indicating to the operator of the tow vehicle that braking action of the trailer is occurring automatically as the result of the operation of the apparatus.

Other objects and advantages reside in the construction of parts, the combination thereof, the method of manufacture, and the mode of operation, as will become more apparent from the following description.

BRIEF DESCRIPTION OF THE DRAWING

FIG. 1 is a schematic type of top view of a trailer vehicle and tow vehicle, attached one to the other and provided with sway control apparatus of this invention.

FIG. 2 is a schematic electrical wiring diagram showing apparatus of this invention.

DETAILED DESCRIPTION OF THE INVENTION

FIG. 1 shows a tow vehicle 10 and a trailer vehicle 12. Any suitable means is employed for attachment of the trailer vehicle 12 to the tow vehicle 10. Herein a tow bar 14 is shown extending rearwardly from the tow vehicle 10 and has a pivotal connection member 16 to which the trailer vehicle 12 is attached. The trailer 12 is shown as having a yoke member 20 which is pivotally attached to the pivotal member 16.

A flexible member 22 is attached to the rearward portion of the tow vehicle 10 at the left-hand portion thereof and a flexible member 24 is attached to the rearward portion of the vehicle 10 at the right-hand portion thereof. The flexible members 22 and 24 may be any suitable means such as cables, ropes, chains, wires and the like. The flexible member 22 extends from the left rearward portion of the tow vehicle 10 to a switch device 28, which is shown as being carried by the trailer vehicle 12. The flexible member 24 extends from the right rearward portion of the tow vehicle 10 to a switch device 30, which is also shown as being carried by the trailer vehicle 12.

A control unit 32 and a battery 36 are also shown as being carried by the trailer vehicle 12. It is to be understood that the switch devices 28 and 30, the control unit 32 and the battery 36 may be carried by the tow vehicle 10 rather than the trailer vehicle 12.

FIG. 2 shows electrical circuitry, most of which is preferably disposed within the control unit 32. FIG. 2 shows a positive main conductor 40 and a negative main conductor 42. The positive conductors 40 and 42 may be connected to the battery 36 and/or to a battery which is conventionally carried by the tow vehicle 10, or to any other suitable source of electrical energy. The conductor 42 may be a "ground" conductor, as shown, which is connected to the frame of the tow vehicle 10 and/or to the frame of the trailer vehicle 12, or may be any other suitable conductor having a potential different from that of the conductor 40. The switch device 28 and the switch device 30 are shown connected to the positive conductor 40.

The control unit 32 includes a latching relay 46, a latching relay 48 and a latching relay 50. The latching relay 46 has switches 52 and 54 and also has actuator coils 56 and 58. The latching relay 48 has switches 60 and 62 and also has actuator coils 64 and 66. The latching relay 50 has switches 68 and 70 and also has actuator coils 72 and 74.

The control unit 32 also includes any suitable time switch 78, which is shown herein as being of the type having a heater coil 80 and a switch element 82. Also included in the control unit 32 is a time switch 84 which is shown as having a heater coil 86 and a switch element 88. An adjustable resistor 83 is connected in series with the heater coil 80, and an adjustable resistor 87 is connected in series with the heater coil 86. Connected to the adjustable resistors 83 and 87 are contacts 98 and 100, respectively, of a switch device 96 having a single-pole, double-throw switch 102 which also has an actuator coil 104. The actuator coil 56 of the latching relay 46 is connected to the actuator coil 64 of the latching relay 48 and to the actuator coil 104 of the switch unit 96.

A switch unit 108 has a switch 110 and an actuator coil 112. A double-pole, double-throw switch 114 has switch elements 116 and 118. The switch unit 114 is preferably manually operated. The switch element 116 is engageable with a contact 120 and the switch element 118 is engageable with a contact 122 or a contact 124.

A switch element 130 is positioned so that it is closed by operation of the foot brake pedal of the tow vehicle. A lamp 132 is preferably disposed on the dashboard or panel area of the tow vehicle and is in series with the switch 130 between the conductors 40 and 42. A conductor 133 is connected to a point between the switch 130 and the lamp 132 and is also connected to the actuator coil 112. Also preferably positioned on the panel or dashboard area of the tow vehicle is a lamp 136.

An actuator coil 140 or a plurality thereof is carried by the trailer vehicle 12 for applying braking operation to the wheels of the trailer vehicle 12. An adjustable resistor 142 is shown connected in series relationship with the actuator coil 140 and in series with the switch 110 of the switch unit 108.

As shown, the switch 28 is connected to the actuator coil 58 of the latching relay 46 and the coil 58 is also connected to the negative conductor 42. The switch 30 is connected to the actuator coil 66 of the latching relay 48. The actuator coil 66 is also connected to the negative conductor 42.

The switches 52 and 54 of the latching relay 46 are connected to the positive conductor 40. The switch 52 is also connected to the switch 60 of the latching relay 48 and the switch 54 is also connected to the switch 62 of the latching relay 48. The switch 62 is connected to a heater coil 150 of a timer device 152. The heater coil 150 is also connected to the negative conductor 42. The timer device 152 has a switch 154 which, when closed, joins the positive conductor 40 to the actuator coil 72 of the latching relay 50. The switch 60 of the latching relay 48 and the switch 52 of the latching relay 46 is also connected to the heater elements 80 and 86 of the timer units 78 and 84, respectively.

Also connected to the positive conductor 40 is an actuator coil 160 of a relay 162, which also has a switch 164. The coil 160 is joined to suitable switch means such as a switch actuator network 170 which is connected by a conductor 172 to the distributor mechanism (not shown) of the tow vehicle 10 or to any other portion of the tow vehicle 10 which is capable of providing a signal directly related to rate of operation of the tow vehicle 10 or the engine thereof. For example, switch 164 may be operated by means joined to one of the ground engaging wheels of the tow vehicle 10 or to the transmission mechanism thereof or to the speedometer mechanism thereof or the like, so that the switch 164 is closed only when the tow vehicle is operating or moving above a predetermined rate. The switch actuator network 170 comprises solid state devices 174 and 175, such as transistors, as shown, and a plurality of resistors 176, a diode 178, a diode 180 and a capacitor 182, which is in the conductor 172 which leads to the distributor of the engine of the tow vehicle. A conductor 186 joins the switch actuator network 170 to the negative conductor 42.

The switch 68 of the latching relay 50 is joined to the positive conductor 40 and to the actuator coil 112 of the switch mechanism 108. The switch 68 is also connected to the contact 122 of the switch unit 114. The contact 120 of the switch unit 114 is joined to the actuator coil 72 of the latching relay 50 and the contact 124 of the switch unit 114 is connected to the actuator coil 104 of the switch mechanism 96. The switch 70 of the latching relay 50 is connected to the actuator coil 72 and to the negative conductor 42.

The switch members 116 and 118 of the switch unit 114 are connected to the positive conductor 40.

The lamp 36 is connected to the switch 110 of the switch unit 108.

OPERATION

When the engine of the tow vehicle 10 is operating above a predetermined rate, for example, twenty miles per hour, a signal through the capacitor 182 causes conduction of a current through the transistor 174, thus, current flows through the actuator coil 160 and causes the switch 164 to close. Thus, the circuitry is in a condition to sense and control a sway situation.

As the tow vehicle 10 is towing the trailer vehicle 12 along a highway or the like, a sway condition in the trailer vehicle 12 may commence. When such a sway condition commences, the trailer vehicle 12 moves angularly with respect to the tow vehicle 10. When such angular movement occurs between the trailer vehicle 12 and the tow vehicle 10, increased tension occurs in the flexible member 22 and/or in the flexible member 24, each of which is joined to the rearward portion of the tow vehicle 10. If the trailer vehicle 12 moves angularly to the right with respect to the tow vehicle 10, tension occurs in the flexible member 22 and causes closing of the switch 28. When the switch 28 closes, the actuator coil 58 of the latching relay 46 is actuated. Operation of the latching relay 46 is such that when the actuator coil 58 is energized both the switch 52 and the switch 54 are closed and are latched in closed position, even though the coil 58 is later deenergized. Likewise, when the actuator coil 56 of the latching relay 46 is energized, and the actuator coil 58 is deenergized, both the switch 52 and the switch 54 are opened. Thus, when the actuator coil 58 is actuated by the closing of the switch 28, the switches 52 and 54 are closed. When the switch 52 is closed, the heater coil 80 of the timer unit 78 is energized and the timer unit 78 begins to "time."

If the sway condition of the trailer vehicle 12 continues by angular movement to the left with respect to the tow vehicle 10, tension in the flexible member 22 is removed and tension occurs in the flexible member 24. Thus, the switch 28 opens and the switch 30 closes and causes the actuator coil 66 of the latching relay 48 to become actuated. If this occurs before the timer unit 78 "times out," the latching relay 46 remains actuated and the switch 52 remains closed, even after the coil is deenergized. When the actuator coil 66 of the latching relay 48 is actuated, the switches 60 and 62 of the latching relay 48 are closed. Thus, the switch 54 and the switch 62, which are in series, are closed. When this occurs, a sway condition is indicated.

Since the switch 164 is closed, as stated above, the actuator coil 74 of the latching relay 50 is energized and closes the switches 68 and 70 of the latching relay 50. When the switch 68 of the latching relay 50 is closed, the actuator coil 112 of the switch unit 108 is energized, and the actuator coil 112 closes the switch 110 of the switch unit 108. When the switch 110 is closed, the brake actuator coil 140 is energized and causes braking or retarding action of the wheels of the trailer vehicle 12. The degree of braking or retarding action created by the braking coil 140 is controlled by adjustment of the adjustable resistor 142. Thus, the adjustable resistor 142 is adjusted so that when the braking coil 140 is energized, desired braking or retarding action of the trailer vehicle occurs to eliminate sway movement thereof.

The heater element 150 of the timer device 152 is energized when the switches 54 and 62, which are in series, are closed.

Thus, at the time that braking or retarding action in the trailer vehicle 12 commences, the timer device 152 begins to time. After a predetermined period of time, such as, for example, 3 to 6 seconds, the timer device 152 "times out" and the switch 154 of the timer device 152 closes. This completes a circuit to the unlatch coil 72 of the latching relay 50, and the relay 50 is unlatched. Unlatching of the relay 50 by energization of the coil 72 opens the switch 68 and deenergizes the coil 112, which opens the switch 110 and deenergizes the braking or retarding coil 140.

The trailer vehicle 12 may sway to one side and then return to alignment with the tow vehicle, without a sway in the other direction. In such event, one of the flexible members 22 or 24 is placed in tension and closes its respective switch 28 or 30. If, for example, the switch 30 is closed, the coil 66 of the latching relay 48 is energized and closes the switches 60 and 62. When the switch 60 is closed, the timer device 78 is energized and begins to time in the manner discussed above. The time before closing of the switch 82 of the timer device 78 is preferably in the order of 4 to 6 seconds. Thus, if the trailer vehicle should momentarily sway in one direction without a sway in the other direction, one of the timer devices 78 or 84 is energized and "times out" in 4 to 6 seconds. When the timer device 78 "times out," the switch 82 thereof closes. Closing of the switch 82 causes energization of the coils 56 and 64 of the latching relays 46 and 48. Thus, both the switches 60 and 62 of the latching relay 48 are again opened.

If the tow vehicle 10 with the trailer vehicle 12 should be negotiating a long curve or a turning action, an angular condition occurs between the tow vehicle 10 and the trailer vehicle 12. For example, if the tow vehicle is turning to the left, tension occurs in the flexible member 24, causing closing of the switch 30. When the switch 30 closes, the actuator coil 66 of the latching relay 48 is energized. Thus, the switches 60 and 62 are latched closed. When the switch 60 is closed, the timer unit 78 or the timer switch 84 is energized, depending upon the position of the switch 102 of the switch unit 96. If, for example, the switch 102 is in engagement with the contact 98, the time switch 78 begins to function, and after a predetermined period of time, for example, 4 to 6 seconds, the time switch 78 "times out" and closes the switch 82 thereof. When the switch 82 closes, the unlatch coils 56 and 64 of the latching relays 46 and 48, respectively, are energized. However, so long as tension exists in the flexible member 24, the switch 30 remains closed. Thus, the latch coil 66 remains energized so that unlatching of the relay 48 cannot occur, even though energization of the coil 64 occurs. However, closing of the switch 82 of the time switch 78 also causes energization of the coil 104 of the relay 96, and the switch 102 is moved from engagement with the contact 98 to engagement with the contact 100. Thus, the time switch 78 is deenergized and the time switch 84 is energized. After the predetermined period of time, for example 4 to 6 seconds, the time switch 84 "times out" and the switch 88 is closed. Again, the unlatch coils 56 and 64 are energized, but since tension remains on the flexible member 24, the switch 30 remains closed. The latch coil 66 remains actuated and unlatch of the relay 48 does not occur. Thus, so long as the switch 30 remains closed, as the tow vehicle 10 and the trailer vehicle 12 travel around a curve, or bend, or corner, or the like, the time switches 78 and 84 continue to function in an alternating manner. However, unless the switch 28 is closed by sway movement of the trailer vehicle 12 in the opposite direction within a predetermined period of time, braking or retarding action is not applied to the trailer vehicle 12.

Other means are provided for release of the braking or retarding action in the trailer vehicle 12. The double-pole, double-throw switch 114 may be manually moved to the right, as shown in FIG. 2 to cause engagement of the switch 116 with the contact 120. This provides a circuit to the unlatch coil 72 of the relay 50 for unlatching thereof. Also, as the switch 116 moves into engagement with the contact 120, the switch 118 moves into engagement with the contact 124. This completes a circuit through the unlatch coils 56 and 64 of the latching relays 46 and 48 for unlatching thereof. Thus, the braking or retarding coil 140 is deenergized and braking or retarding action in the trailer vehicle 12 ceases.

Means are also provided for manually energizing the braking or retarding coil 140. The double-pole, double-throw switch 114 may be moved to the left as viewed in FIG. 2 so that the switch 118 engages the contact 122. When this occurs, the coil 112 of the relay 108 is energized, closing the switch 110 and energizing the braking or retarding coil 140 and applying a braking or retarding action to the trailer vehicle 12. Due to the fact that the lamp 136 is in parallel with the braking or retarding coil 140, the lamp 136 is energized and lighted with energization of the coil 140.

The switch 130 is closed by operation of the brake pedal of the tow vehicle 10. Closing of the switch 130 provides a circuit through the coil 112 of the relay 108, closing the switch 110 and energizing the braking or retarding coil 140 of the trailer vehicle 12. The lamp 132 is energized and lighted with closing of the switch 130.

If movement or operation of the tow vehicle becomes less than a predetermined rate, the switch actuator network 170 deenergizes the coil 160 of the relay 162 and the switch 164 is opened. When this occurs, the latching coil 74 of the relay 50 cannot become energized to close the switch 68, to energize the coil 112 of the relay 108, to close the switch 110, to energize the brake actuator coil 140. Thus, when the trailer vehicle 12 is being towed below a given rate or when the trailer vehicle 12 is being parked or the like, the circuitry of this invention does not cause braking or retarding action in the trailer vehicle 12, regardless of the angle of movement which may occur between the trailer vehicle 12 and the tow vehicle 10.

It is to be understood that within the purview of this invention electronic tube or solid state devices may be employed as switching means, rather than the electromechanical switch means shown herein.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Apparatus for automatically eliminating a sway condition in a trailer vehicle which is towed by a tow vehicle, the trailer vehicle having brakes for retarding the rate of movement thereof, comprising:
sensing means sensing an angular condition between the trailer vehicle and the tow vehicle,
brake applicator means for operation of the brakes of the trailer vehicle,
the sensing means including means sensing oscillatory angular movement between the trailer vehicle and the tow vehicle as the trailer vehicle angularly moves in one direction followed by angular movement of the trailer vehicle in the opposite direction,
the sensing means including timer means timing the occurrence of angular movement of the trailer in one direction followed by angular movement of the trailer vehicle in the opposite direction within a predetermined period of time,
the sensing means including control means for actuation of the brake applicator means when the timer means times the occurrence of angular movement of the trailer vehicle in one direction followed by angular movement of the trailer vehicle in the opposite direction within said predetermined period of time.

2. The apparatus of claim 1 in which the sensing means includes timer means for deactivation of the brake applicator means after a predetermined period of time.

3. The apparatus of claim 1 in which the sensing means includes means deenergizing the control means when operation of the tow vehicle is below a predetermined rate.

4. The apparatus of claim 3 in which the tow vehicle includes an engine having distributor mechanism and in which the means deenergizing the control means when operation of the tow vehicle is below a predetermined rate comprises means connected to distributor mechanism of the engine of the tow vehicle.

5. The apparatus of claim 1 in which the timer means includes a pair of timer members and in which the sensing means includes means joining the timer members one to the other for alternate operation thereof.

6. Apparatus for automatically eliminating a sway condition in a trailer vehicle having retardation means, the trailer vehicle being towed by a tow vehicle which is pivotally attached thereto, comprising:
switch means,
means operably connected to the switch means for operation of the switch means with pivotal movement between the trailer vehicle and the tow vehicle,
circuit closure means joined to the switch means for closing of the circuit closure means with operation of the switch means,
timer means connected to the circuit closure means for operation of the timer means with operation of the circuit closure means,
means connecting the timer means to the circuit closure means for operation of the circuit closure means with operation of the timer means,
control means for operation of the retardation means of the trailer vehicle, the control means being connected to the circuit closure means fo operation of the control means with operation of the circuit closure means.

7. Apparatus for eliminating a sway condition of a trailer vehicle which is towed by a tow vehicle, the trailer vehicle having retardation means, comprising:
first switch means,
means for operation of the first switch means with angular movement of the trailer vehicle to the right with respect to the tow vehicle,
second switch means,
means for operation of the second switch means with angular movement of the trailer vehicle to the left with respect to the tow vehicle,
first latching circuit closure means, the first latching circuit closure means being connected to the first switch means for operation of the first latching circuit closure means with operation of the first switch means,
second latching circuit closure means, the second latching circuit closure means being connected to the second switch means for operation of the second latching circuit closure means with operation of the second switch means,
timer means connected to the latching circuit closure means for energization of the timer means with operation of the latching circuit closure means, the timer means also being connected to the latching circuit closure means for unlatching thereof,
actuator means joined to the latching circuit closure means for operation of the actuator means with operation of the first latching circuit closure means and the second latching circuit closure means,
the actuator means being connected to the retardation means of the trailer vehicle for operation of the retardation means by the actuator means.

8. Apparatus for automatically eliminating sway of a trailer vehicle which is towed by a tow vehicle, comprising:
retardation means for retarding the movement of the trailer vehicle, sensing means sensing angular movement of the trailer vehicle with respect to the tow vehicle, the sensing means including actuator means for operation of the retardation means, the sensing means including means sensing angular movement of the trailer vehicle with respect to the tow vehicle as a result of a sway condition of the trailer vehicle, the sensing means also including means sensing angular movement of the trailer vehicle with respect to the tow vehicle which is the result of a condition other than a sway condition, the sensing means including timer means distinguishing between angular movement of the trailer vehicle with respect to the tow vehicle which is a result of a sway condition and angular movement of the trailer vehicle with respect to the tow vehicle which is the result of a condition other than a sway condition, the sensing means including means for actuation of the actuator means only upon the sensing of angular movement of the trailer vehicle which is a result of sway condition.

9. Apparatus for elimination of a sway condition in a trailer vehicle which is pivotally attached to a tow vehicle for tow behind the tow vehicle, comprising:
first switch means,
sensing means sensing angular movement of the trailer vehicle, the sensing means joined to the first switch means for operation of the first switch means when the trailer vehicle pivotally moves to the left with respect to the tow vehicle, second switch means, the sensing means also being joined to the second switch means for operation of the second switch means with pivotal movement of the trailer vehicle to the right with respect to the tow vehicle, timer means, means joining the timer means to the first switch means and to the second switch means for operation of the timer means with operation of either of the switch means, means joining the timer means to the first switch means and to the second switch means for operation of the switch means by operation of the timer means.

retardation means for retarding the rate of movement of the trailer vehicle, means joining the retardation means to the switch means for activation of the retardation means with operation of both the first switch means and the second switch means.

10. The apparatus of claim 9 in which the timer means includes a pair of timer members and which includes means for connecting the timer members one to the other for alternating operation thereof.

11. The apparatus of claim 9 which includes retardation time control means and means joining the retardation time control means to the retardation means for deactivation of the retardation means by operation of the retardation time control means.

12. The apparatus of claim 9 which includes rate means joined to the tow vehicle, sensitizing means for sensitizing the retardation means, and means joining the rate means to the sensitizing means for sensitizing the retardation means when the rate of operation of the tow vehicle is above a predetermined rate.

13. Apparatus for automatically eliminating sway of a trailer vehicle which is towed by a tow vehicle, comprising:

braking means for retarding movement of the trailer vehicle, sensing means sensing angular movement of the trailer vehicle with respect to the tow vehicle, the sensing means including actuator means for operation of the braking means, the sensing means including means sensing angular movement of the trailer vehicle with respect to the tow vehicle as a result of a sway condition of the trailer vehicle, the sensing means also including means sensing angular movement of the trailer vehicle with respect to the tow vehicle which is a result of a condition other than a sway condition, the sensing means including oscillatory sensing means distinguishing between angular movement of the trailer vehicle with respect to the tow vehicle which is a result of a sway condition and angular movement of the trailer vehicle with respect to the tow vehicle which is the result of a condition other than a sway condition, the sensing means including means for actuation of the actuator means only upon the sensing of angular movement of the trailer which is a result of a sway condition.

* * * * *